United States Patent Office 3,409,704
Patented Nov. 5, 1968

3,409,704
POLYCARBONATE COMPOSITIONS
John V. Bailey, New Martinsville, W. Va., assignor to Mobay Chemical Company, Pittsburgh, Pa., a corporation of Delaware
No Drawing. Filed Oct. 16, 1964, Ser. No. 404,488
5 Claims. (Cl. 260—860)

ABSTRACT OF THE DISCLOSURE

Polycarbonate polymers suitable for preparing haze-free film at great thicknesses and having a molecular weight of at least about 20,000 and the generic formula $R'(T-G)_nOR'$ wherein T is (a)
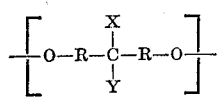

and G is (b) 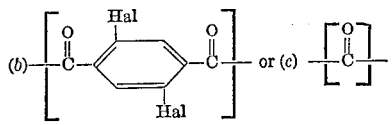 or (c) 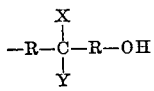

wherein (b) is present in the molecule in an amount of from about 1 to about 25 mol percent based on (a), and (c) is present in the molecule in an amount of from about 99 to about 75 mol percent based on (a), and wherein R is either phenylene, halo-substituted phenylene or alkyl substituted phenylene; X and Y are either hydrogen and/or hydrocarbon radicals free from aliphatic unsaturation and having a maximum of about 12 carbon atoms, but preferably consisting of 1 carbon atom each; Hal is chlorine and/or bromine; R' is either hydrogen, $$-R-\overset{X}{\underset{Y}{C}}-R-OH$$

or a monofunctional organic radical, and $n$ is an integer sufficient to provide a molecular weight of at least about 20,000.

---

This invention relates to thermoplastic substances and more particularly to novel polycarbonates and their methods of manufacture.

Methods for the production of polycarbonates and various polycarbonate copolymers are well known in the art, and processes which may be used to make such materials may be found in U.S. Patents 3,043,800 and 3,042,802 and in Canadian Patents 578,795, 594,805 and 611,970. Perhaps the most commercially successful process for making polycarbonates is discussed in U.S. Patent 3,028,365, in which the process disclosed generally involves the phosgenation of 2,2-bis(4-hydroxyphenyl) propane (Bisphenol A), until the desired material is obtained.

Polycarbonate materials fabricated according to such processes are especially suitable for the manufacture of photographic elements such as films; however, the thickness to which clear transparent Bisphenol A polycarbonate film can be cast is rather limited. When a comparatively thin, clear, transparent film is desired, relatively few difficulties are encountered, but when thicker films, such as industrial arts photographic films are required, Bisphenol A-based materials have not been acceptable. The objectionable characteristic of the Bisphenol A polycarbonate films is that a thickness greater than 4 mils cannot be obtained without the formation of a haze which is believed to be caused by crystallization which occurs in the solids upon evaporation of the solvent from the polycarbonate material. Of course, the attainable haze-free thickness will vary depending upon the process conditions, etc., but usually a maximum of about 4 mils thick is the limit in order to produce a haze-free film from Bisphenol A polycarbonates.

It is, therefore, an object of this invention to provide a novel polycarbonate composition adapted for use in the production of haze-free film at a thickness greater than heretofore provided. Another object of this invention is to provide a novel polycarbonate copolymer composition having improved physical properties. A further object of this invention is to provide a process for the production of these novel polycarbonate copolymers. A still further object of this invention is to provide a method for the production of a polycarbonate from which substantially haze-free films of a thickness greater than 4 mils can be fabricated. Yet another object of this invention is to provide a process for elimination or reduction of haze in polycarbonate films of a thickness greater than 4 mils.

The foregoing objects and others are accomplished in accordance with this invention, generally speaking, by providing a novel polycarbonate composition having a molecular weight of at least about 20,000 and having the generic formula $R'(T-G)_nOR'$ wherein T is (a)
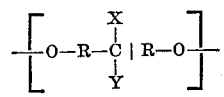

and G is (b)
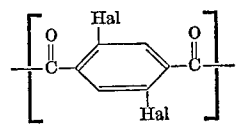

or (c)

wherein (b) is present in the molecule in an amount of from about 1 to about 25 mol percent based on (a), and (c) is present in the molecule in an amount of from about 99 to about 75 mol percent based on (a), and wherein R is either phenylene, halo-substituted phenylene or alkyl substituted phenylene; X and Y are either hydrogen and/or hydrocarbon radicals free from aliphatic unsaturation and having a maximum of about 12 carbon atoms, but preferably consisting of 1 carbon atom each; Hal is chlorine and/or bromine; R' is either hydrogen, $$-R-\overset{X}{\underset{Y}{C}}-R-OH$$

or a monofunctional organic radical, and $n$ is an integer sufficient to provide a molecular weight of at least about 20,000.

In the generic formula, any suitable monofunctional organic radical which may also be used as the R' includes those derived from phenol and alkyl and halo-substituted phenols. Such substituted phenols contain alkyl groups having from 1 to 5 carbon atoms including normal alkyl and isoalkyl groups which are situated in one or more positions on the ring, and those having halogen atoms including fluorine, chlorine, bromine, iodine and mixtures thereof in one or more positions on the ring. It is within the contemplated scope of this invention that although no positions on the phenol ring may be substituted, any number, including all of the positions on the ring may be substituted (with halogen atoms, for example) and, absent steric hindrance, all of the infinite variety of compounds which are thus operative, are contemplated.

R in Formulae *a* and *d* may be any phenylene, halo-substituted phenylene or alkyl substituted phenylene. Any halogen atom may be used in one or more positions on the phenylene ring and all the halogens are thus contemplated with chlorine and bromine preferred. Any alkyl or isoalkyl group having preferably from 1 to 5 carbon atoms may be substituted in one or more positions on the phenyl-

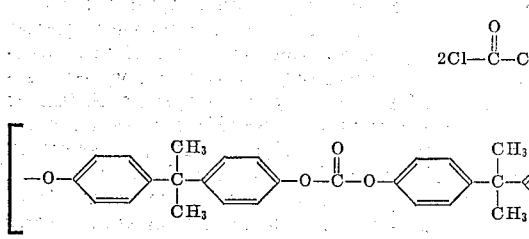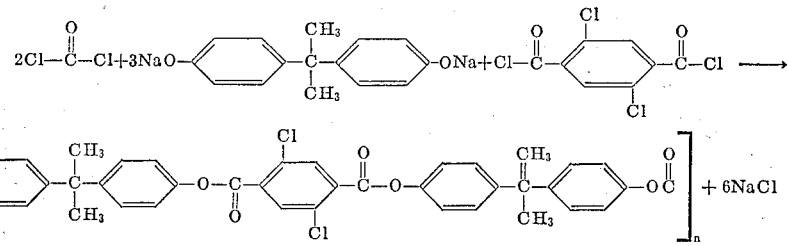

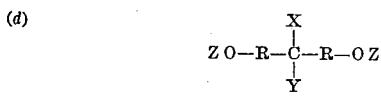

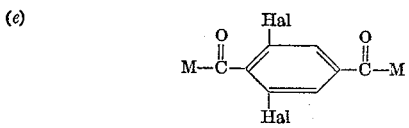

ene ring, and although the phenylene ring may have no substituents on it, conversely, all of the available positions on the ring may be substituted, if desired.

The polycarbonate copolymers of this invention are technically very useful products since they possess certain physical properties which make them especially suitable for use in the manufacture of photographic films, and especially in the manufacture of photographic film of a high dimensional stability. Such polymers are preferably obtained by reacting a compound having the formula (d)
$$ZO-R-\underset{Y}{\overset{X}{\underset{|}{C}}}-R-OZ$$

with about 1 to about 25 mol percent based on Formula *a* of a compound having the formula (e)
$$M-\overset{O}{\underset{}{C}}-\underset{\text{Hal}}{\overset{\text{Hal}}{\bigcirc}}-\overset{O}{\underset{}{C}}-M$$

together with at least enough phosgene, a diester of carbonic acid, a diaryl carbonate or a mixture of the latter two, to total 100 mol percent on the basis of the compound of Formula *d* and preferably about 120 mol percent thereof. In the above formulae, R, X, Hal and Y have the same meaning as they do in previously defined formulae herein; Z is either hydrogen, sodium or potassium; and M is either chlorine, bromine, or an ester grouping having from one to about five carbon atoms per ester group. It is to be noted that where Z in Formula *d* is either sodium or potassium, M should be either chlorine and/or bromine, and phosgene is used to prepare the polycarbonate; where Z in Formula *d* is hydrogen, M should be an ester grouping having up to about five carbon atoms per ester group, and a diester of carbonic acid, a diaryl carbonate or a mixture thereof is used to prepare the polycarbonate. In addition where Z in Formula *d* is hydrogen, a caustic such as sodium or potassium hydroxide should be used in preparing the polycarbonate by the phosgenation process.

In a preferred embodiment of this invention, when the melt or transesterification process as described in Canadian Patent 578,795 is to be used to produce the copolymer presently described herein, an ester of a dihaloterephthalic acid must be used with a diester of carbonic acid, a diaryl carbonate or a mixture thereof instead of phosgene. Any suitable ester of either dichloro-, dibromo-, or chlorobromoterephthalic acid having up to about 5 carbon atoms per ester group may be employed, but preferably dimethyl-2,5-dichloroterephthalate is used in this process together with diphenyl carbonate and Bisphenol A or in other words (4,4′-dihydroxydiphenyl-2,2-propane) to form a polycarbonate copolymer. The 2,5-dihaloterephthaloyl chloride mentioned throughout this disclosure is therefore intended also to include the esters of dihaloterephthalic acid.

In another preferred embodiment wherein the interfacial polycondensation method is used to produce the copolymer described herein, the disodium salt of a di(hydroxyaryl)alkane, preferably Bisphenol A, is used. The reaction proceeds according to the equation Although the units of the molecule are here shown alternating in a random relationship to one another, it is to be understood that they may be also linked in a block type of relationship, depending on the order of addition of the components to one another. Where, as in the preferred embodiment of this invention, all the components are added simultaneously, a random type linkage will occur. Further, it is evident that variations in the mol ratios of the components will also vary the structure of the polymer.

In the process of this preferred embodiment, any suitable di(hydroxyaryl)alkane such as (4,4′-dihydroxydiphenyl)methane,
2,2-(4,4′-dihydroxydiphenyl)propane,
1,1-(4,4′-dihydroxydiphenyl)cyclohexane,
1,1-(4,4′-dihydroxy-3,3′-dimethyldiphenyl)cyclohexane,
2,2-(2,2′-dihydroxy-4,4′-di-tert.-butyl-diphenyl)propane, and
3,4-(4,4′-dihydroxydiphenyl)hexane and
1,1-(4,4′-dihydroxydiphenyl)-1-phenylethane, as well as methane derivatives which in addition to two hydroxyaryl groups bear an alkyl radical with at least two carbon atoms and a second alkyl radical with one or more carbon atoms, such as 2,2-(4,4′-dihydroxydiphenyl)butane,
2,2-(4,4′-dihydroxydiphenyl)pentane,
3,3-(4,4′-dihydroxydiphenyl)pentane,
2,2-(4,4′-dihydroxydiphenyl)-3-methyl-butane,
2,2-(4,4′-dihydroxydiphenyl)hexane,
2,2-(4,4′-dihydroxydiphenyl)-4-methyl-pentane,
2,2-(4,4′-dihydroxydiphenyl)heptane,
4,4-(4,4′-dihydroxydiphenyl)heptane, and
2,2-(4,4′-dihydroxydiphenyl)tridecane or mixtures thereof, may be first converted to its disodium salt with the addition of a concentrated solution of sodium hydroxide, preferably about a 50% solution thereof, after which methylene chloride or any suitable solvent, such as is disclosed in Polycarbonates by Christopher and Fox, is added. The phosgenation of the disodium salt of Bisphenol A is begun substantially simultaneously with the addition of caustic and a methylene chloride solution, or any suitable solvent solution, of the terephthaloyl chloride, with the addition rates controlled so that the addition of caustic is completed before the addition of the calculated quantities of the dichloroterephthaloyl chloride and phosgene are complete. The product may then be transferred to a mixer and mixed until a dough forms, which is then rinsed with caustic to insure the removal of unreacted Bisphenol A, followed by a phosphoric acid rinse, and finally with water rinses to insure the removal of any electrolytes. The polycarbonate copolymer is then recovered by any of the methods well known in the art and a suitable film is produced therefrom by dissolving the polycarbonate thus obtained in any suitable solvent, such as methylene chloride, to a concentration of about 21%, heating to remove any entrapped air, cooling and then casting the film as required.

In preparing the composition of this invention, it is preferred that from about 1 to about 10 molar parts of 2,5-dichloroterephthaloyl chloride or its derivatives and about 90 to about 99 molar parts of phosgene be used together with a maximum of about 100 molar parts of a di(hydroxyaryl)alkane or the disodium salt thereof. Polycarbonates thus fabricated provide a film-forming material which allows appreciably thicker haze-free films to be cast than were previously possible when using substantially pure Bisphenol A polycarbonate. Heretofore, when preparing a film of a thickness exceeding about 4 mils from a Bisphenol A polycarbonate, the evaporation of the solvent caused the linear polycarbonate to become packed together and begin to crystallize causing the undesirable haze. This problem is obviated by the present invention in which it is believed that the chlorine or bromine atoms on the aromatic ring of the 2,5-dihaloterephthaloyl chloride included in the polycarbonate chain helps to keep the linear molecules apart and disrupts the symmetry of the molecules so that they are prevented from being packed together, thus preventing crystallization and obviating the haze. The film produced is not only haze-free at a greater thickness, but it is also dimensionally stable and particularly adapted for a use wherein dimensions are retained on film without deviation.

In addition to various polycarbonate copolymers containing about 10 mole percent of the terephthaloyl compound according to the preferred embodiment of this invention, other copolymers prepared by the polycondensation of BPA with 2,5-dichloroterephthaloyl chloride (and using from about 15 to 25 mole percent excess of phosgene) are also eminently suitable for the preparation of films having a thickness greater than about 4 mils. Typical preparations illustrated below are various other preferred embodiments of this invention whereby the invention is further illustrated and all parts are by weight unless otherwise specified.

EXAMPLE 1

1 mol percent 2,5-dichloroterephthaloyl chloride copolymer

About 511 parts of Bisphenol A (2.24 mols) and about 2.88 parts of p,t-butyl phenol are suspended in about 1938 parts of water and well agitated in a three-neck reaction flask. The three-neck flask is equipped with a gas addition tube and a drip tube for the addition of liquid. Any oxygen which may have adhered to the particles of the reaction components is removed from the suspended Bisphenol A slurry by blowing nitrogen through it for about 15 minutes, and/or subjecting it to a vacuum. After the removal of oxygen, about 358 parts of a 50% solution of sodium hydroxide is added. The reaction flask is then cooled to about 25° C., and about 1138 parts of methylene chloride is added to the reactor while agitating. After the methylene chloride addition is completed, the addition of phosgene is started at such a rate that over a 100 minute period about 265.6 parts (2.68 mols) of phosgene is added while agitation is maintained. Simultaneously with the start of phosgenation, the addition of about 107.9 parts of a 50% solution of sodium hydroxide and a methylene chloride solution of about 6.1 parts (0.022 mol) of 2,5-dichloroterephthaloyl chloride is started through different charge ports. The 50% sodium hydroxide solution is charged into the reactor in about 80 minutes and the 2,5-dichloroterephthaloyl chloride solution is charged into the reactor in about 90 minutes while the temperature is maintained at about 25° C. At the end of phosgenation, the reaction slurry is transferred to a sigma mixer where approximately 2 parts of triethylamine is added to the mixture which is allowed to mix until a heavy dough is formed. The resulting dough is washed with a caustic solution, a phosphoric acid solution and finally with water to remove any electrolytes. The polycarbonate obtained by this method may then be isolated as a dry powder by any known method. The product, at a concentration of about 0.5 part of polymer in about 100 ml. of methylene chloride, has a relative viscosity at 25° C. of about 1.60.

EXAMPLE 2

2.5 mol percent 2,5-dichloroterephthaloyl chloride copolymer

About 503 parts of Bisphenol A (2.21 mols) and about 2.88 parts of p,t-butyl phenol are suspended in about 1948 parts of water and well agitated in a three-neck reaction flask. The three-neck flask is equipped with a gas addition tube and a drip tube for the addition of liquid. Any oxygen which may have adhered to the particles of the reaction components is removed from the suspended Bisphenol A slurry by blowing nitrogen through it for about 15 minutes and after the removal of oxygen, about 352.6 parts of 50% solution of sodium hydroxide is added. The reaction flask is then cooled to about 25° C. and about 1141 parts of methylene chloride is added to the reactor while agitating. After the methylene chloride addition is completed, the addition of phosgene is started at such a rate that over a 100 minute period about 261.6 parts (2.64 mols) of phosgene is added while agitation is maintained. Simultaneously with the start of phosgenation, the addition of about 115.8 parts of a 50% solution of sodium hydroxide and a methylene chloride solution of about 15.4 parts (0.057 mol) of 2,5-dichloroterephthaloyl chloride is started through different charge ports. The 50% sodium hydroxide solution is charged into the reactor in about 80 minutes and the 2,5-dichloroterephthaloyl chloride solution is charged into the reactor in about 90 minutes while the temperature is maintained at about 25° C. At the end of the phosgenation, the reaction slurry is transferred to a sigma mixer where approximately 2 parts of triethylamine is added to the mixture which is allowed to mix until a heavy dough is formed. The resulting dough is washed with a caustic solution, a phosphoric acid solution and finally with water to remove any electrolytes. The polycarbonate obtained by this method may then be isolated as a dry powder by any known method. The product, at a concentration of about 0.5 part of polymer in about 100 ml. of methylene chloride, has a relative viscosity at 25° C. of about 1.60.

EXAMPLE 3

2.5 mol percent 2,5-dichloroterephthaloyl chloride block copolymer

About 503 parts of Bisphenol A (2.21 mols) and about 2.88 parts of p,t-butyl phenol are suspended in about 1948 parts of water and well agitated in a three-neck reaction flask. The three-neck flask is equipped with a gas addition tube and a drip tube for the addition of liquid. Any oxygen which may have adhered to the particles of the reaction components is removed from the suspended Bisphenol A slurry by blowing nitrogen through it for about 15 minutes and after the removal of oxygen, about 352.6 parts of a 50% solution of sodium hydroxide is added. The reaction flask is cooled to about 25° C. and about 1141 parts of methylene chloride is added to the reactor while agitating. After the methylene chloride addition is completed, the addition of phosgene is started at such a rate that over a 50 minute period, about 130.8 parts (1.32 mols) of phosgene is added while agitation is maintained. Simultaneously with the beginning of the phosgenation, the addition of about 57.9 parts of a 50% solution of sodium hydroxide is begun through another charge port and carried out over a period of about 40 minutes. When the additions are complete, a methylene chloride solution of about 15.4 parts (0.057 mol) of 2,5-dichloroterephthaloyl chloride is added in about 45 minutes while the temperature is maintained at about 25° C. When the addition of the 2,5-dichloroterephthaloyl chloride is completed, about 130.8 parts of phosgene (1.32 mols) is charged into the reaction mixture at about 50 minutes. Simultaneously with the start of the phosgenation, the addition of about 57.9 parts of about a 50% solution of sodium hydroxide is charged through another charge port for about 40 minutes. At the end of the phosgenation, the reaction slurry is transferred to a sigma mixer where approximately 2 parts of triethylamine is added to the mixture which is allowed to mix until a heavy dough is formed. The resulting dough is washed with a caustic solution, a phosphoric acid solution and finally with water to remove any electrolytes. The polycarbonate obtained by this method may then be isolated as a dry powder by any known method. The product, at a concentration of about 0.5 parts of polymer in about 100 ml. of methylene chloride, has a relative viscosity at 25° C. of about 1.60.

EXAMPLE 4

5 mol percent 2,5-dichloroterephthaloyl chloride copolymer

About 490.1 parts of Bisphenol A (2.15 mols) and about 3.38 parts of p,t-butyl phenol are suspended in about 1965 parts of water and well agitated in a three-neck reaction flask. The three-neck flask is equipped with a gas addition tube and a drip tube for the addition of liquid. Any oxygen which may have adhered to the particles of the reaction components is removed from the suspended Bisphenol A slurry by blowing nitrogen through it for about 15 minutes and after the removal of oxygen, about 343.5 parts of 50% solution of sodium hydroxide is added. The reaction flask is then cooled to about 25° C. and about 1200 parts of methylene chloride is added to the reactor while agitating after the methylene chloride addition is completed; the addition of phosgene is started at such a rate that over a 100 minute period about 254.8 parts (2.58 mols) of phosgene is added while agitation is maintained. Simultaneously with the start of phosgenation, the addition of about 103.0 parts of a 50% solution of sodium hydroxide and a methylene chloride solution of about 30.8 parts (0.113 mol) of 2,5-dichloroterephthaloyl chloride is started through different charge ports. The 50% sodium hydroxide solution is charged into the reactor in about 80 minutes and the 2,5-dichloroterephthaloyl chloride solution is charged into the reactor in about 90 minutes while temperature is maintained at about 25° C. At the end of the phosgenation, the reaction slurry is transferred to a sigma mixer where approximately 2 parts of triethylamine is added to the mixture which is allowed to mix until a heavy dough is formed. The resulting dough is washed with a caustic solution, a phosphoric acid solution and finally with water to remove any electrolytes. The polycarbonate obtained by this method may then be isolated as a dry powder by any known method. The product, at a concentration of about 0.5 part of polymer in about 100 ml. of methylene chloride, has a relative viscosity at 25° C. of about 1.60.

EXAMPLE 5

11 mol percent, 2,5-dichloroterephthaloyl chloride copolymer

About 464.3 parts of Bisphenol A (2.03 mols) and about 3.38 parts of p,t-butyl phenol is suspended in about 2005 parts of water and well agitated in a three-neck reaction flask. The three-neck flask is equipped with a gas addition tube and a drip tube for the addition of liquid. Any oxygen which may have adhered to the particles of the reaction components is removed from the suspended Bisphenol A slurry by blowing nitrogen through it for about 15 minutes and after the removal of oxygen, about 325.4 parts of a 50% solution of sodium hydroxide is added. The reaction flask is then cooled to about 25° C. and about 1157 parts of methylene chloride is added to the reactor while agitating. After the methylene chloride addition is completed, the addition of phosgene is started at such a rate that over a 100 minute period about 241.5 parts (2.44 mols) of phosgene is added while agitation is maintained. Simultaneously with the start of phosgenation, the addition of about 81.4 parts of a 50% solution sodium hydroxide and a methylene chloride solution of about 61.5 parts (0.23 mol) of 2,5-dichloroterephthaloyl chloride is started through different charge ports. The 50% sodium hydroxide solution is charged into the reactor in about 80 minutes and the 2,5-dichloroterephthaloyl chloride solution is charged to the reactor in about 90 minutes while the temperature during the phosgenation reaction is maintained at about 25° C. At the end of the phosgenation, the reaction slurry is transferred to a sigma mixer where approximately 2 parts of triethylamine is added to the mixture which is allowed to mix until a heavy dough is formed. The resulting dough is washed with a caustic solution, a phosphoric acid solution and finally with water to remove any electrolytes. The polycarbonate obtained by this method may then be isolated as a dry powder by any known method. The product at a concentration of about 0.5 part of polymer in 100 ml. of methylene chloride, has a relative viscosity at 25° C. of about 1.60.

EXAMPLE 6

Various samples of polycarbonate materials including those made by the process of the Examples 1 to 5 are cast into films of various thickness. The thickness of each at which a haze begins to form was noted.

About a 21% solution of polycarbonate in methylene chloride is prepared from the several polycarbonate compositions, including those obtained by the procedures described in above Examples 1 to 5. When the polycarbonate is completely dissolved, the solution is heated to boiling under reflux to remove entrapped air from solution and the solution is then allowed to cool. Films are cast on a glass plate from the cool 21% solutions, employing the usual draw-bar procedure. The cast films are allowed to dry at room temperature until the film spontaneously releases from the glass plate.

The draw-bar employed is designed so that either end of the blade can be raised or lowered, allowing either a flat, uniform film of desired thickness or a film tapered in thickness from one edge to the other, to be cast. For the determination of moduli, films are cast such that the final films have a thickness of from about 6 to 7 mils and are relatively even and flat. The modulus of each film is determined at several temperatures, and the data plotted; the temperature at which the modulus is 10,000 p.s.i. is then read from the graph. For the determination of the maximum haze-free film thickness to which the polycarbonate may be cast, one side of the draw-bar is raised, resulting in the casting of a tapered film; when dry, a micrometer is used to measure the thickness of the film below which the film is clear and above which the film exhibits a cloudiness or haze.

The results of these determinations are indicated in the following table:

| Compositions used, prepared by phosgenation of— | Film thickness at which haze begins to form, mils | Temperature ° C. at which modulus is $10^4$ p.s.i. |
| --- | --- | --- |
| (A) 2.5 mol percent 2,5-dichloroterephthaloyl chloride based on the Bisphenol A | 16.7 | 150.5 |
| (B) 5 mol percent 2,5-dichloroterephthaloyl chloride based on the Bisphenol A | 18.0 | 144.0 |
| (C) 11 mol percent 2,5-dichloroterephthaloyl chloride based on the Bisphenol A | 19.0 | 140.0 |
| (D) 100 mol percent Bisphenol A | 4.0 | 154.5 |

Further, in films obtained from copolymers containing about 10 mol percent or more of the dichloroterephthaloyl groups based on the di(hydroxyaryl)alkane which is here, for the purposes of illustration, Bisphenol A thicknesses greater than 19 mils and up to about 23 mils could be obtained without the formation of a haze. In another composition prepared by the phosgenation of 1 mol percent 2,5-dichloroterephthaloyl chloride and Bisphenol A, a film thickness greater than 10.0 mils and up to about 12.0 mils was obtained before a haze began to form. The temperature at which the modulus is $10^4$ p.s.i. for a composition including about 2.5% 2,5-dichloroterephthaloyl chloride is 150° C.

It will be noted that the 2,5-dichloroterephthaloyl chloride-Bisphenol A-based materials may be cast into film thicknesses substantially greater than that of the Bisphenol A-based material before a haze formed. However, the ability of the films (of uniform thickness) to retain their strength at a given temperature vary significantly as indicated in the last column of the table above. The materials based on copolymers containing from about 1 to 10 mol percent 2,5-dichloroterephthaloyl chloride indicate over-all superior properties and as such are considered to be the best compositions.

Although the invention has been described in considerable detail in the foregoing examples, it is to be understood that the examples are not intended to limit the invention and that any suitable reactant in accordance with the disclosure herein may be used to substitute for any of those named in the examples. For instance, any of the di(hydroxyaryl)alkanes disclosed or mixtures thereof or the disodium salts and mixtures thereof may be used instead of Bisphenol A in these examples and any of the other reactants of the examples may be substituted with any of the other reactants disclosed herein as suitable for the same purpose. Therefore, it is to be understood that variations can be made by those skilled in the art without departing from the spirit and scope of the invention.

What is claimed is:

1. A polycarbonate composition having a molecular weight of at least about 20,000 and having the generic formula:

$$R'\text{-}(T\text{-}G)_n OR'$$

wherein T is (a) 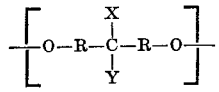

and G is (b) 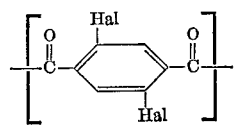

and (c) 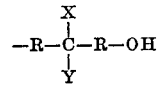

and wherein R' is a member selected from the group consisting of hydrogen, $$-R-\overset{X}{\underset{Y}{C}}-R-OH$$

and a monofunctional organic radical; R is selected from the group consisting of phenylene, halo-substituted phenylene and alkyl substituted phenylene; X and Y are each selected from the group consisting of hydrogen and hydrocarbon radicals free from aliphatic unsaturation, the total number of carbon atoms in X and Y being up to about 12; Hal is a member selected from the group consisting of chlorine and bromine, $n$ is an integer sufficient to provide a molecular weight of at least about 20,000, the units (b) plus (c) equal the unit (a), and the ratio of (c) to (b) is from about 3 to 99.

2. The composition of claim 1 wherein units (a), (b), and (c) are randomly linked.

3. The composition of claim 1 wherein units (a), (b), and (c) are block linked.

4. The polycarbonate composition of claim 1 wherein unit (a) is the residue of a di(hydroxyaryl)alkane.

5. The polycarbonate composition of claim 4 in which the di(hydroxyaryl)alkane is 2,2-(4,4'-dihydroxydiphenyl)propane.

References Cited

UNITED STATES PATENTS

| | | | |
|---|---|---|---|
| 2,922,779 | 1/1960 | Lincoln et al. | 260—75 |
| 3,110,698 | 11/1963 | Laakso et al. | 260—47 |
| 3,148,985 | 9/1964 | Ossenbrunner et al. | 260—47 |
| 3,169,121 | 2/1965 | Goldberg | 260—47 |
| 3,265,762 | 8/1966 | Quisenberry | 260—860 |
| 3,282,893 | 11/1966 | Shechter | 260—47 |

FOREIGN PATENTS 1,287,519  2/1962  France.

GEORGE F. LESMES, *Primary Examiner.*